United States Patent Office 2,809,717
Patented Oct. 15, 1957

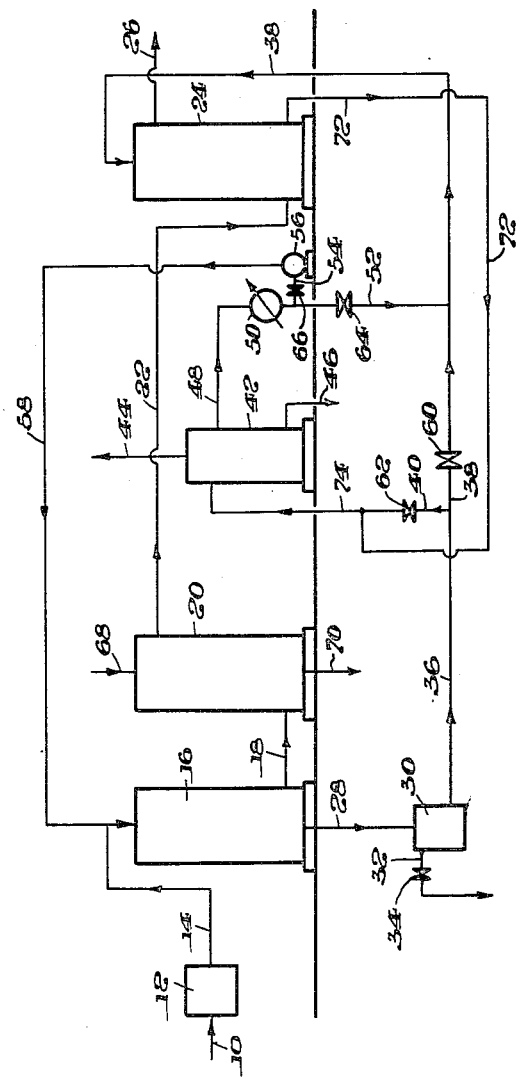

2,809,717

PROCESS FOR SEPARATING AROMATIC HYDROCARBONS FROM COAL DISTILLATION GASES

Adolf Schmalenbach, Essen-Stadtwald, Germany, assignor, by mesne assignments, to Koppers Company, Inc., Pittsburgh, Pa., a corporation of Delaware Application November 2, 1955, Serial No. 544,565

6 Claims. (Cl. 183—120)

The present invention relates to a process for removal of aromatic hydrocarbons, e. g., benzene, toluene, xylene, solvent naphtha, and naphthalene from coal distillation gases, e. g., coke oven gas, under increased pressure.

It is known to scrub coke oven gas with hydrocarbon oils, either under normal pressure or under increased pressure, as it is being piped considerable distances in order to remove benzene hydrocarbons from this gas. The hydrocarbon oil used for the scrubbing, for example, wash oil which is enriched with benzene hydrocarbons by the treatment with coke oven gas, is again freed of its absorbed constituents by distillation. A subsequent scrubbing of the gas with a high boiling hydrocarbon oil, especially anthracene oil, is usually connected with the gas scrubbing with wash oil in order to remove the residual naphthalene content of the gas. This subsequent scrubbing with anthracene oil is especially necessary when the gas is supplied to the long distance pipelines under increased pressure, since in this case the naphthalene content of the gas must be less than usual. For gas that is piped long distances the naphthalene content of the gas per 100 m$^3$. (standard conditions) must be less than 5 g./$p$, wherein $p$ is the value of the superatmospheric pressure.

It has now been determined that when gas is to be piped a considerable distance and which leaves the compressor at a temperature of 130° C. and is again cooled in an indirect cooler to normal temperature, e. g. 25° C., not only is there precipitated in addition to water a part of the high boiling benzene hydrocarbons but also a greater part of the naphthalene is separated from the gas and is dissolved in the high boiling benzene hydrocarbons. It has been observed that the naphthalene content of the gas under pressure after the gas leaves the indirect cooler, in any event, in the case of many gases, is under the above given value.

When this gas which is very lean in naphthalene is treated with standard coal-tar wash oil to wash out the benzene, the naphthalene content of the gas is again increased since the vapor pressure of the naphthalene present in the wash oil is generally higher than that of the residual naphthalene still present in the gas before introduction of the gas in the benzene scrubber. The gas thus leaves the benzene scrubber with a considerably higher naphthalene content under certain circumstances than it had on entrance into the benzene scrubber.

Removal of this naphthalene, newly dissolved in the gas by the benzene scrubbing, by means of anthracene oil has the disadvantage that an additional scrubbing medium must be used for purification of the gas and has the additional disadvantage that special apparatus entailing higher operating costs must be used for regeneration or removal of naphthalene from the anthracene oil.

According to the invention the so-called final naphthalene scrubbing is effected by means of a scrubbing medium which accumulates in the process on cooling the compressed gas from the compressor temperature to normal temperature. The condensate accumulating in this indirect cooling of the gas contains in addition to water a comparatively large amount of solvent naphtha as well as benzene, toluene and xylene. This mixture of materials has exceptional solvent properties for naphthalene and is, therefore, essentially better suited for the final naphthalene scrubbing than the anthracene oil.

The invention consists in using the condensate, which accumulates in the indirect cooling of the compressed gas to normal temperature and from which the water has been removed, for scrubbing the residual naphthalene from the gas leaving the benzol scrubber.

According to another characteristic of the invention the condensate, before its delivery into the final naphthalene scrubber, is completely or partially freed of low boiling hydrocarbons and naphthalene by a fractional distillation. In this way losses of benzene are avoided and the naphthalene content of the gas can be reduced to an especially low value after the final naphthalene scrubber. This distillation requires no additional expenditure since the condensate from the cooler must be distilled to recover the benzene therefrom.

The discharge liquid withdrawn from the final naphthalene scrubber is distilled in suitable manner with the condensate from the gas cooler in the same apparatus in order to separate on the one hand the naphthalene and to recover on the other hand the benzene hydrocarbons in comparatively pure form. Since the amount of scrubbing medium required for the final scrubbing is comparatively small on account of its high dissolving power for naphthalene, practically no additional energy is consumed by distillation of this amount of scrubbing medium (solvent naphtha) in the available distillation apparatus for the condensate of the cooler.

Under certain circumstances, it is advantageous to inject an additional amount of solvent naphtha in finely-distributed form in the to-be-purified compressed gas before its entrance into the indirect coler and/or on its passage through the cooler. Thereby there is achieved a further reduction of the naphthalene content of the gas before its introduction into the benzol scrubber, which is always desirable since the naphthalene level in the benzene wash oil can thereby be maintained correspondingly low. A further advantage which is obtained by injecting solvent naphtha in the to-be-debenzolized gas is that a part of the benzene present in the gas corresponding to the equilibrium with the solvent naphtha is liquefied even before entrance of the gas into the benzol scrubber and is separated from the gas. The heat of condensation or of solution formed in the liquefaction of the benzene is carried into the gas cooler without it being necessary to increase the cooling capacity to any extent, if at all. In this method of operation smaller amounts of benzene go into the benzol scrubber which again has the result that the amount of benzene wash oil can be reduced without increasing the temperature of the wash oil in the benzol scrubber. A decreased amount of wash oil signifies a reduction in cost for distilling off the absorbed benzene from the enriched wash oil. The extra energy is under certain circumstances considerably less than the additional expenditure of energy which is necessary for a crude separation of the benzene from the solvent naphtha.

An apparatus for carrying out the process of the invention is schematically illustrated in the drawing.

The to-be-treated gas flows from line 10 into a compressing zone or compressor 12 where it is compressed to a pressure of 8–9 atmospheres with an increase of temperature to about 130° C. The hot compressed gas then flows through line 14 into indirect cooler 16, and then through line 18 into the benzol scrubbing column or scrubber 20 and finally through line 22 into the final naphthalene scrubbing column or scrubber 24 which it leaves through line 26.

The gas is cooled in cooler 16 to normal temperature, e. g. 25° C., whereby in addition to water a mixture of hydrocarbons in liquid form is separated which flows through line 28 into separator 30. In separator 30 the water is separated in a layer from the non-aqueous constituents of the condensate and is withdrawn through line 32 in which the pressure valve 34. The condensate consisting of practically only non-aqueous components, e. g., about 30% benzene, 18% toluene, 17.7% xylene, 24.2% solvent naphtha and 10.1% naphthalene is withdrawn through line 36 and is partially, directly added to the final naphthalene scrubber 24 through line 38, whereas another portion is flowed through line 40 into a comparatively small distillation column 42 in which benzene is separated from the condensate through line 44 and naphthalene through line 46. The solvent naphtha vapors flow from the column 42 through line 48 into cooler 50 and are there liquefied. A part of the liquid solvent naphtha is flowed through line 52 and is combined with the solvent naphtha flowing through line 38 and is used for the final naphthalene scrubbing in scrubber 24, whereas another portion which is withdrawn through line 54 is injected by means of pump 56 through line 58 into the hot gas before introduction into cooler 16. The proportion of the amounts in lines 38 and 40 can be regulated by control valves 60 and 62. Control valves 64 and 66 are provided in lines 52 and 54 and distribute the flow of solvent naphtha in the desired manner to both lines.

The cooled compressed gas is washed in scrubber 20 with a greatly reduced amount of benzene wash oil in comparison to normal operation. The wash oil is added to the top of the scrubber through line 68. The benzene-enriched wash oil leaves the scrubber through line 70 and goes from there into the benzene plant, in which the wash oil is again freed of the absorbed benzene, cooled, regenerated if necessary, and then again added to scrubber 20 for the purpose of scrubbing additional quantities of gas.

The discharge liquid accumulating in the final naphthalene scrubber consists essentially of naphthalene-containing solvent naphtha and is flowed through line 72 into line 74 and from there into distillation column 42 in which the condensate coming from separator 30 is distilled.

What is claimed is:

1. A process for separating aromatic hydrocarbons from coal distillation gases under pressure, which comprises compressing the coal distillation gases whereby the temperature of the gases is elevated, indirectly cooling the gases of elevated temperature to normal temperature whereby a condensate containing liquid benzene hydrocarbons, napthalene, solvent naptha, and water separates from the cooled gases, separating water from said condensate, scrubbing the gases from the indirect cooling step in a benzol scrubber with wash oils, which wash oil absorbs benzene hydrocarbons from said gases, said gases after the scrubbing in said benzol scrubber containing residual napthalene, and scrubbing the gases containing residual napthalene from the benzol scrubber with the condensate containing liquid benzene hydrocarbons, napthalene, and solvent naptha, separate from water whereby said condensate dissolves the residual napthalene from said gases.

2. A process for separating aromatic hydrocarbons from coal distillation gases under pressure, which comprises compressing the coal distillation gases whereby the temperature of the gases is elevated, indirectly cooling said gases of elevated temperature to normal temperature whereby a condensate containing liquid benzene hydrocarbons, napthalene, solvent naptha, and water separates from the cooled gases, stratifying said condensate to form superposed layers of water and a liquid mixture of benzene hydrocarbons, napthalene, and solvent naptha, scrubbing the gases from the indirect cooling step in a benzol scrubber with a solvent for benzene hydrocarbons, which solvent absorbs benzene hydrocarbons from said gases, said gases after the scrubbing in said benzol scrubber containing residual napthalene, and withdrawing at least a portion of the liquid mixture of benzene hydrocarbons, napthalene, and solvent naptha from the layer thereof separate from water, and scrubbing the gases containing residual napthalene from the benzol scrubber with said liquid mixture to dissolve residual napthalene from said gases.

3. A process for separating aromatic hydrocarbons from coal distillation gases under pressure, which comprises compressing the coal distillation gases whereby the temperature of the gases is elevated, indirectly cooling said gases of elevated temperature in a cooling zone to normal temperature whereby a condensate containing liquid benzene hydrocarbons, napthalene, solvent naptha and water separates from the cooled gases, withdrawing said condensate from said cooling zone, and conducting said condensate to a separating zone, maintaining said condensate in the separating zone whereby said condensate separates into a lower layer of a liquid mixture of benzene hydrocarbons, napthalene, and solvent naptha, and an upper layer of water, withdrawing the gases from said cooling zone and scrubbing these gases in a benzol scrubbing column with a solvent for benzene hydrocarbons which solvent absorbs benzene hydrocarbons from said gases, said gases after the scrubbing in said benzol scrubbing column containing residual napthalene, withdrawing the scrubbed gases from the benzol scrubbing column and introducing these gases into a lower portion of a napthalene scrubbing column, withdrawing at least a portion of the liquid mixture of benzene hydrocarbons, napthalene and solvent naptha from the layer thereof separate from the water and introducing this mixture into an upper portion of said napthalene scrubbing column whereby said liquid mixture of benzene hydrocarbons, napthalene, and solvent naptha and the gases pass downwardly and upwardly respectively within said napthalene scrubbing column in countercurrent contact with each other whereby said liquid mixture dissolves residual napthalene from the gases.

4. A process in accordance with claim 3 wherein the coal distillation gases are coke oven gas.

5. A process of claim 3 further characterized in that the liquid mixture of benzene hydrocarbons, napthalene and solvent naphtha separate from water, which is withdrawn from the separating zone, is at least partially freed of low boiling hydrocarbons and napthalene by means of fractional distillation, prior to introducing the liquid mixture into the upper portion of the napthalene scrubbing column.

6. A process for separating aromatic hydrocarbons from coal distillation gases under pressure, which comprises compressing the coal distillation gases whereby the temperature of the gases is elevated, indirectly cooling said gases of elevated temperature in a cooling zone to normal temperature whereby a condensate containing liquid benzene hydrocarbons, napthalene, solvent naptha and water separates from the cooled gases, withdrawing said condensate from said cooling zone and conducting said condensate to a separating zone, maintaining said condensate in the separating zone whereby the condensate separates into a lower layer of a liquid mixture of benzene hydrocarbons, napthalene, and solvent naptha and an upper layer of water on said lower layer, withdrawing the gases from the said cooling zone and introducing said gases into a lower portion of a benzol scrubbing column, introducing wash oil into an upper portion of said benzol scrubbing column whereby said wash oil and said gases pass downwardly and upwardly respectively within said benzol scrubbing column in countercurrent contact with each other whereby the wash oil absorbs benzene hydrocarbons from said gases, said gases after the scrubbing in said benzol scrubbing column containing residual napthalene, withdrawing the scrubbed gases from an upper portion of said benzol scrubbing column and introducing the gases into a lower portion of a napthalene scrubbing column, withdrawing at least a portion of the liquid mixture of benzene hydrocarbons, napthalene and solvent naptha from the layer thereof separate from the water and introducing this mixture into an upper portion of said napthalene scrubbing column, whereby said liquid mixture of benzene hydrocarbons, napthalene and solvent naptha and the gases pass downwardly and upwardly respectively within said napthalene scrubbing column in countercurrent contact with each other whereby said liquid mixture dissolves residual napthalene from said gases.

References Cited in the file of this patent

UNITED STATES PATENTS

| | | |
|---|---|---|
| 2,198,743 | Schuftan | Apr. 30, 1940 |
| 2,649,404 | Reynolds | Aug. 18, 1953 |
| 2,649,405 | Eaton | Aug. 18, 1953 |